United States Patent
Park et al.

(10) Patent No.: US 8,208,401 B2
(45) Date of Patent: Jun. 26, 2012

(54) METHOD OF MANAGING ADDRESS SPACES OF INCOMMUNICABLE NODES IN ZIGBEE NETWORK

(75) Inventors: Noseong Park, Seoul (KR); Yoonmee Doh, Daejeon (KR); Hyunhak Kim, Daegu (KR); Sun-Joong Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1347 days.

(21) Appl. No.: 11/859,902

(22) Filed: Sep. 24, 2007

(65) Prior Publication Data

US 2008/0080416 A1    Apr. 3, 2008

(30) Foreign Application Priority Data

Sep. 29, 2006   (KR) .................. 10-2006-0096583

(51) Int. Cl.
*H04L 12/28* (2006.01)
(52) U.S. Cl. ......... 370/254; 370/255; 370/256; 370/328
(58) Field of Classification Search .................. None
See application file for complete search history.

(56) References Cited

U.S. PATENT DOCUMENTS

| | | | | |
|---|---|---|---|---|
| 7,450,954 | B2 * | 11/2008 | Randall | 455/456.1 |
| 7,633,882 | B2 * | 12/2009 | Das et al. | 370/252 |
| 7,653,010 | B2 * | 1/2010 | Ensor et al. | 370/255 |
| 2005/0030945 | A1 | 2/2005 | Sarikaya et al. | |
| 2005/0281207 | A1 * | 12/2005 | Lee et al. | 370/256 |
| 2008/0080416 | A1 * | 4/2008 | Park et al. | 370/328 |

FOREIGN PATENT DOCUMENTS

| | | |
|---|---|---|
| KR | 1020010025757 | 4/2001 |
| KR | 1020040023304 | 3/2004 |
| KR | 1020050005152 | 1/2005 |
| KR | 1020050038448 | 4/2005 |
| KR | 1020060010989 | 2/2006 |
| KR | 1020060027967 | 3/2006 |
| KR | 1020060088254 | 8/2006 |

OTHER PUBLICATIONS

Korean Notice of Patent Grant dated Mar. 29, 2008 for the corresponding application KR 10-2006-0096583.

* cited by examiner

*Primary Examiner* — Robert Wilson
(74) *Attorney, Agent, or Firm* — Ladas & Parry LLP

(57) ABSTRACT

Provided is a method of managing addresses of incommunicable nodes in a ZigBee network, and more particularly, a method of managing address values of a plurality of nodes that form a ZigBee network by efficiently withdrawing address values from nodes which are incommunicable for reasons of abnormality. An address management process can be performed using two methods. According to a first method, a parent node withdraws address values of child nodes that do not transmit a hello message for a predetermined period of time. According to a second method, a parent node transmits a periodic or non-periodic request message to child nodes, and the child nodes, which receive the request message, immediately transmit a hello message to the parent node. Then, the parent node withdraws address values of child nodes that do not respond to the request message sent by the parent node more than a predetermined number of times. An address value assignment process and a process for nodes that have their address values withdrawn are also provided.

4 Claims, 7 Drawing Sheets

METHOD OF MANAGING ADDRESS SPACES OF INCOMMUNICABLE NODES IN ZIGBEE NETWORK

This application claims the priority of Korean Patent Application No. 10-2006-0096583, filed on Sep. 29, 2006, in the Korean Intellectual Property Office, the disclosure of which is incorporated herein in its entirety by reference.

BACKGROUND OF THE INVENTION

1. Field of the Invention

The present invention relates to a ZigBee network, and more particularly, to a method of managing address values of a plurality of nodes that form a ZigBee network by efficiently assigning and withdrawing the address values to/from the nodes.

This work was supported by the IT R&D program of MIC/IITA. [2005-S-038-02, Development of UHF RF-ID and Ubiquitous Networking Technology]

2. Description of the Related Art

If an address space assigned to a child node in a ZigBee network is no longer used due to a malfunction, battery exhaustion, or movement of the child node, another node may not be able to join the ZigBee network since the address space is exhausted. In order to solve this problem, the ZigBee network needs to be examined first.

The ZigBee network was formed by a ZigBee Alliance jointly established by firms and organizations from around the world in order to implement a low power-consuming and highly efficient short-distance wireless network based on the IEEE 802.15.4 standard. The ZigBee network is composed of tree routing and mesh routing. In tree routing, a plurality of nodes form a tree, and data is transmitted by communications between parent and child nodes. The mesh routing uses an ad hoc on-demand distance vector (AODV) protocol.

When a tree is formed, each child node is assigned a unique address value by a parent node. The address value is like a sequence ID given to each child node by means of a depth first search of the tree. Therefore, if a child node moves to another location in the tree and joins a new parent node, the child node has to be assigned a new address value. Since the maximum number of child nodes that a parent node can have is predetermined, the parent node requires a technique for efficiently managing address values that are assigned or are to be assigned to child nodes.

U.S. Patent Publication No. 2005-0281207, entitled "Zig-Bee Network Device for Separately Determining Network Parameters and Assigning Addresses, and Address Assignment Method Thereof," was filed on Jun. 14, 2005 and published on Dec. 22, 2005 by Samsung Electronics Co., Ltd. This invention is designed to prevent the waste of address space by determining a network parameter according to an individual condition of each node and varying the size of the address space secured, unlike in prior ZigBee technology. In addition, the invention is designed to avoid securing an unnecessarily large address space and thus wasting the address space by adjusting, from among parameters, the maximum number of child nodes and the maximum number of routers that each node can have according to an individual condition of each node. However, the invention fails to suggest a method of withdrawing unused address values of a plurality of address values that are assigned and reusing the withdrawn address values later in order to secure an address space having a desired size before assigning address values. Furthermore, although the invention seeks to secure an address space having a required size by appropriately adjusting at least one of the maximum number of child nodes and the maximum number of routers that a parent node can have according to the condition of the parent node, it fails to suggest a method in which a parent node can identify a hello message periodically or non-periodically transmitted from child nodes after securing an address space and assigning address values to the child nodes and can directly withdraw unused address values of the assigned address values.

SUMMARY OF THE INVENTION

The present invention provides an address management method in a ZigBee network in which a parent node withdraws address values of child nodes that do not transmit a hello message for a predetermined period of time, withdraws address values of child nodes that do not respond to a request message sent by the parent node more than a predetermined number of times, or commands a child node that has an address value withdrawn to leave or assigns a new address value to the child node having the withdrawn address value in order to prevent an address space from being exhausted, even if unused, due to inefficient management and avoid a situation where nodes cannot join the ZigBee network due to the exhaustion of the address space.

According to an aspect of the present invention, there is provided a method of managing address spaces of incommunicable nodes. The method includes receiving a hello message indicating communicability from a second node, wherein the second node is a child node of a first node in a ZigBee network; if a difference between a current time and the received time is less than or equal to a predetermined time then the second node in the ZigBee network transmits a message identifying communicability to the first node; otherwise if the difference between the current time and the received time is greater than the predetermined time then the second node in the ZigBee network transmits a different message to the first node withdrawing an address value assigned by the second node.

According to another aspect of the present invention, there is provided a method of managing address spaces of incommunicable nodes. The method includes transmitting by a first node in a ZigBee network a message identifying whether said first node in the ZigBee network can communicate with said second node wherein said second node is a child node; retransmitting the message identifying whether said first node in the ZigBee network can communicate with said second node up to a predetermined number of retransmission and if a reply is not received within the predetermined number of retransmission then transmitting a message withdrawing an address value assigned to the second node.

According to another aspect of the present invention, there is provided a method of managing address spaces of incommunicable nodes. The method includes receiving data containing an address at a first node of a ZigBee network wherein the second node is a child node of the first node of the ZigBee network; comparing the address value received to the latest address value stored in the first node of the ZigBee network; accepting the data if the address value received and the latest address value match; not accepting the data if the address value received and the latest address value do not match and either commanding the second node to leave or assign a new address value to the second node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
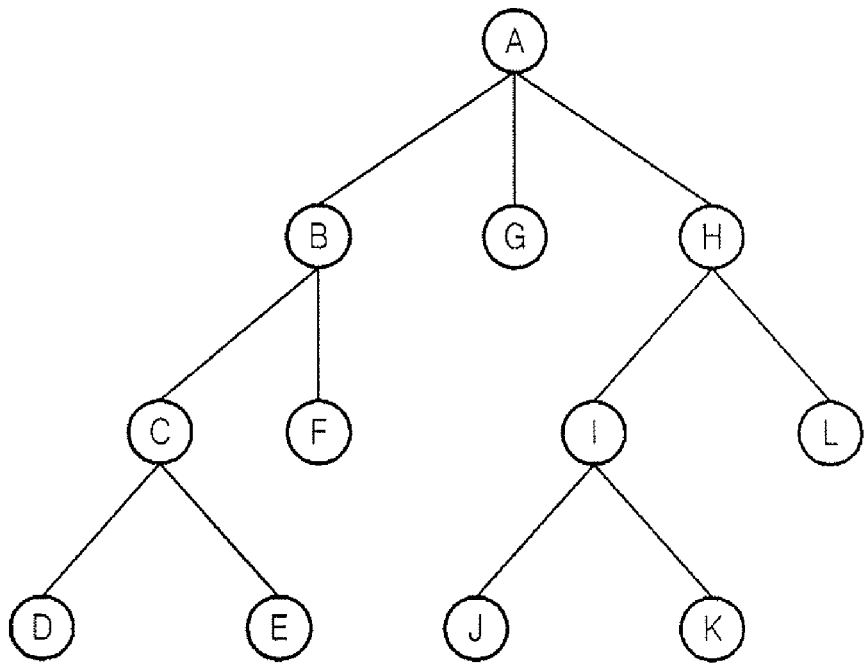
FIG. 1 illustrates a ZigBee network composed of a plurality of nodes according to an embodiment of the present invention.

FIG. 1 illustrates a ZigBee network composed of a plurality of nodes according to an embodiment of the present invention.

In the ZigBee network, when a new child node arrives and transmits a join message to a parent node, the parent node assigns an address value to the new child node. Later if the child node with the assigned address value fails to transmit a leave message to the parent node due to the malfunction, battery exhaustion or sudden movement of the child node, the parent node cannot withdraw the assigned address value. In a state in which each parent node secures a finite number of address values assigned to child nodes, if this happens very frequently, address values that can be assigned are exhausted even though there are not many nodes that actually exist. Consequently, new nodes may no longer be able to join the ZigBee network.

In order to solve such a problem, the present invention suggests two methods. According to a first method, child nodes periodically transmit a hello message to a parent node, and the parent node withdraws address values of child nodes that do not transmit the hello message for a predetermined period of time. According to a second method, a parent node periodically or non-periodically transmits a request message to child nodes, and the child nodes, which receive the request message, immediately transmit a hello message to the parent node. Then, the parent node withdraws address values of child nodes that do not respond to the request message sent by the parent node more than a predetermined number of times.

To achieve the goal of the present invention, a method of managing an address space in a ZigBee network may be suggested. The method includes assigning address values to child nodes using a parent node in a ZigBee network composed of a plurality of nodes, periodically or non-periodically transmitting a hello message from the child nodes to the parent node, and detecting the child nodes based on the withdrawn address values and taking action accordingly.

Referring to FIG. 1, a node A is a ZigBee coordinator (ZC) which is responsible for forming, operating, and managing the ZigBee network and has an address value of zero. The other nodes are assigned address values by respective parent nodes and transmit data along with their parent or child node.

A method of efficiently managing an address space in a ZigBee network according to an embodiment of the present invention will now be described in detail.

Figure 2:
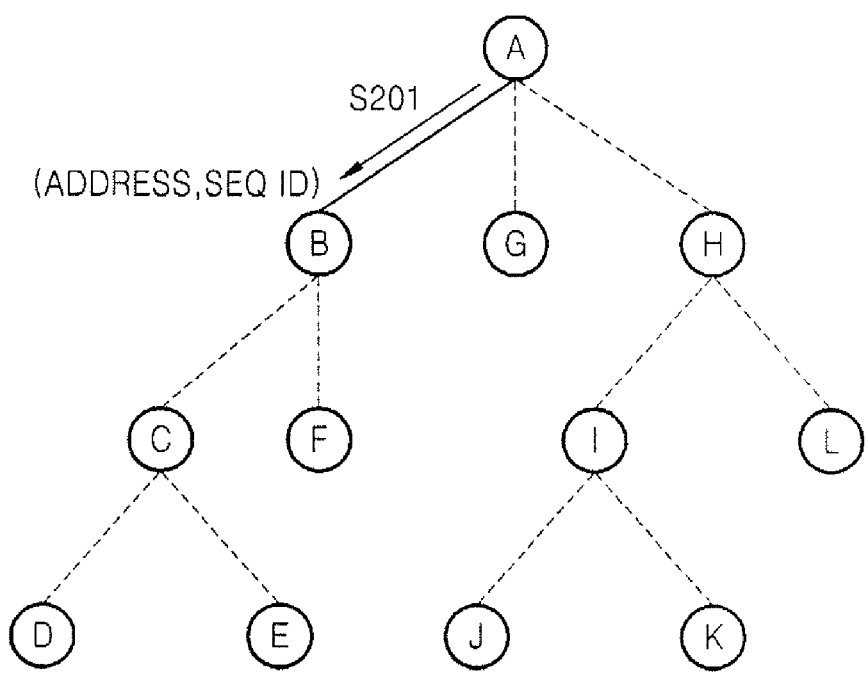
FIG. 2 illustrates a transmission flow in an address assignment process in the ZigBee network according to an embodiment of the present invention.

FIG. 2 illustrates a transmission flow in an address assignment process in a ZigBee network according to an embodiment of the present invention. The address assignment process is as follows.

First of all, a child node, which desires to join the ZigBee network, transmits a join request message to an appropriate parent node. Then, the parent node, which receives the join request message, transmits to the child node a join response message containing an address value that is to be assigned to the child node and a sequence ID indicating where the child node comes in a sequence of child nodes. In this way, the child node that transmitted the join request message is assigned the address value and the sequence ID by the parent node.

Referring to FIG. 2, a node B transmits a join request message to a node A in operation S201. Then, node A transmits to node B an appropriate address value that is to be assigned to node B and a sequence ID indicating where node B comes in a sequence of nodes. Consequently, node B can have its address value and sequence ID. In this way, other nodes, which have not yet joined the ZigBee network, are assigned respective address values and sequence IDs by respective parent nodes.

Figure 3:
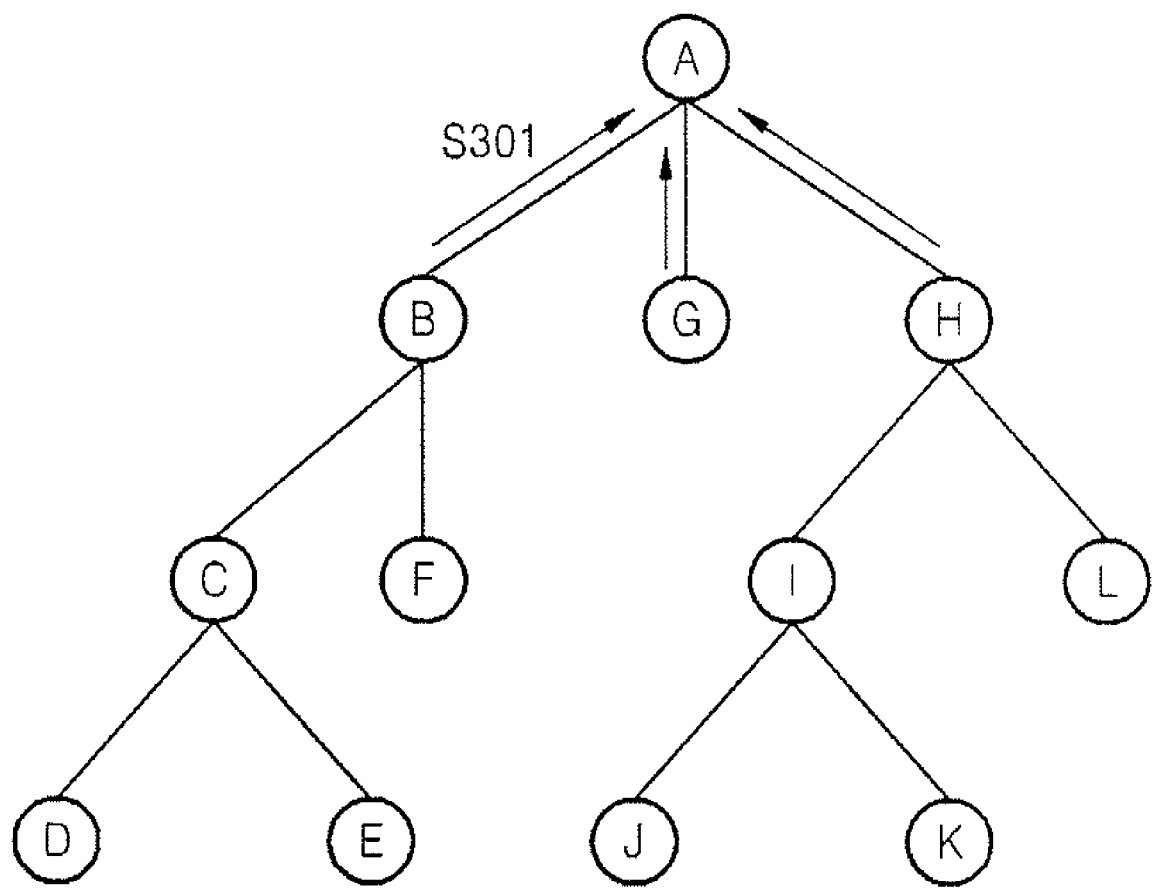
FIG. 3 illustrates a transmission flow in an address management method in the ZigBee network using periodic transmission according to an embodiment of the present invention.

FIG. 3 illustrates a transmission flow in an address management method in a ZigBee network using periodic transmission according to an embodiment of the present invention. The address management method using periodic transmission is as follows.

First of all, child nodes, which have joined the ZigBee network, periodically transmit a hello message to a parent node. Then, the parent node stores information regarding the hello message periodically received from the child nodes in an appropriate form. In addition, the parent node withdraws address values assigned to child nodes which have not transmitted the hello message for a predetermined period of time.

Referring to FIG. 3, nodes B, G and H, which successfully joined the ZigBee network using the address assignment method described above, periodically transmit a hello message to a node A, which is a parent node, in operation S301. Then, node A stores information regarding the time when a latest hello message was received. If node A has not received the hello message from a child node for a predetermined period of time, it withdraws an address value assigned to the child node so that the withdrawn address value can be assigned to a prospective child node which transmits a join request message.

Figure 4:
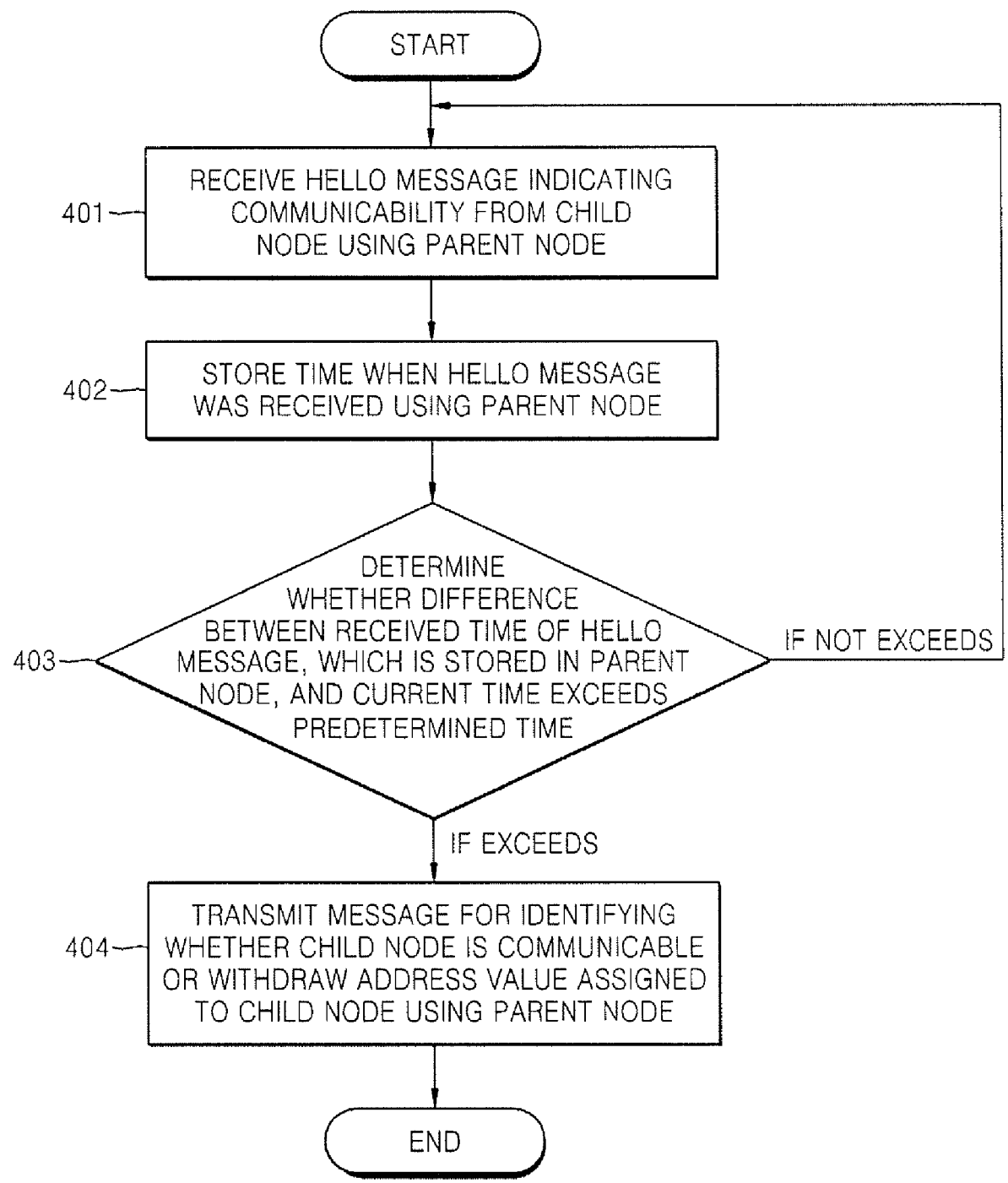
FIG. 4 is a flowchart illustrating an address management method in the ZigBee network using periodic transmission according to an embodiment of the present invention.

FIG. 4 is a flowchart illustrating an address management method in a ZigBee network using periodic transmission according to an embodiment of the present invention.

Referring to FIG. 4, a parent node (a first node) receives periodically a hello message indicating communicability from a child node (a second node) in a ZigBee network (operation 401). Here, the parent node stores the time when the hello message is received (operation 402).

If the difference between the received time, which is stored in the parent node, and a current time exceeds a predetermined time (operation 403), the parent node transmits a message to the child node in order to identify whether the child node is communicable or else the parent node withdraws an address value assigned to the child node (operation 404). If the difference does not exceed the predetermined time, the parent node takes no action since it has received the periodic hello message from the child node, which indicates that the child node is communicable.

Figure 5:
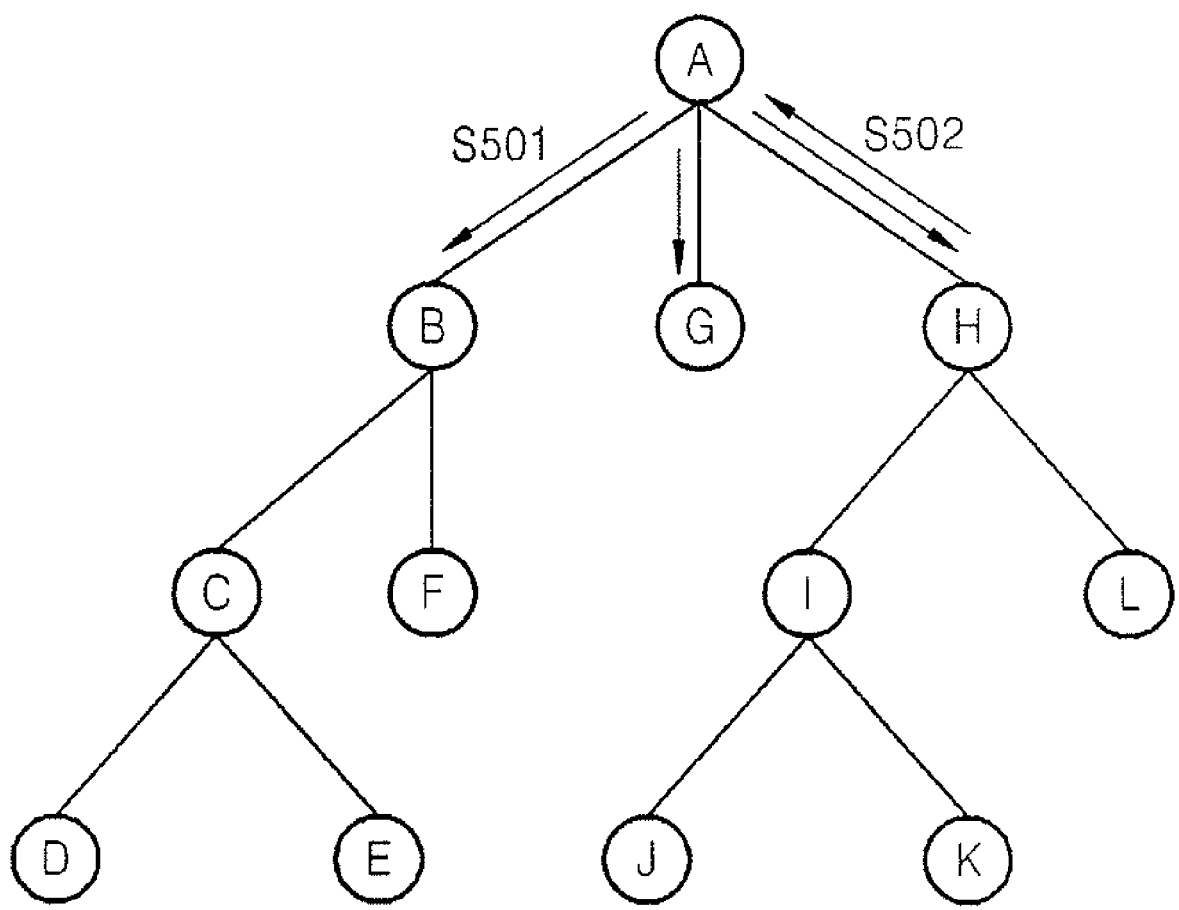
FIG. 5 illustrates a transmission flow in an address management method in the ZigBee network using non-periodic transmission according to an embodiment of the present invention.

FIG. 5 illustrates a transmission flow in an address management method in a ZigBee network using non-periodic transmission according to an embodiment of the present invention. The address management method using non-periodic transmission is as follows.

First of all, a parent node transmits a hello request message to its child nodes to identify the states of the child nodes. Then, the child nodes receive the hello request message and transmit a hello message to the parent node. The parent node withdraws an address value assigned to a child node which does not respond more than a predetermined number of times to the hello request message sent by the parent node.

Referring to FIG. 5, nodes B, G and H, which successfully joined the ZigBee network using the address assignment method described above, transmit a non-periodic hello message to a node A which is a parent node. Node A transmits a hello request message to all of its child nodes in operation S501. In operation S502, if node H transmitted the hello message to node A in response to the hello request message, but nodes B and G did not respond more than a predetermined number of times to the hello request message sent by node A, node A withdraws address values assigned to nodes B and G so that the withdrawn address values can be assigned to prospective child nodes which transmit a join request message.

Figure 6:
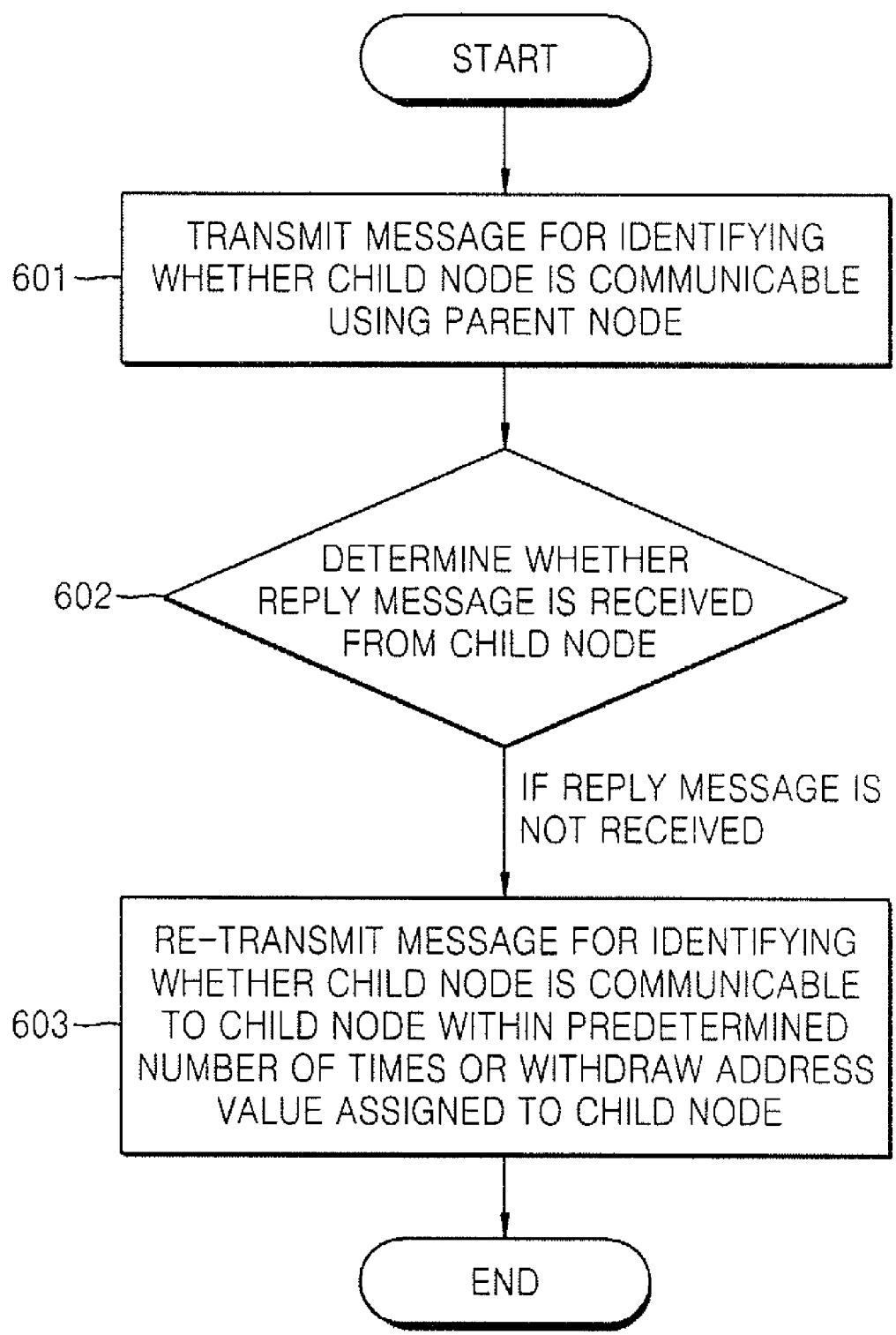
FIG. 6 is a flowchart illustrating an address management method in the ZigBee network using non-periodic transmission according to an embodiment of the present invention.

FIG. 6 is a flowchart illustrating an address management method in a ZigBee network using non-periodic transmission according to an embodiment of the present invention.

Referring to FIG. 6, a parent node (a first node) transmits a non-periodic message (a hello request message) in order to identify whether a child node (a second node) is communicable to the child node (operation 601). If the parent node does not receive a reply message from the child node (operation 602), it transmits the message again within a predetermined number of times or else the parent node withdraws an address value assigned to the child node (operation 603).

Figure 7:
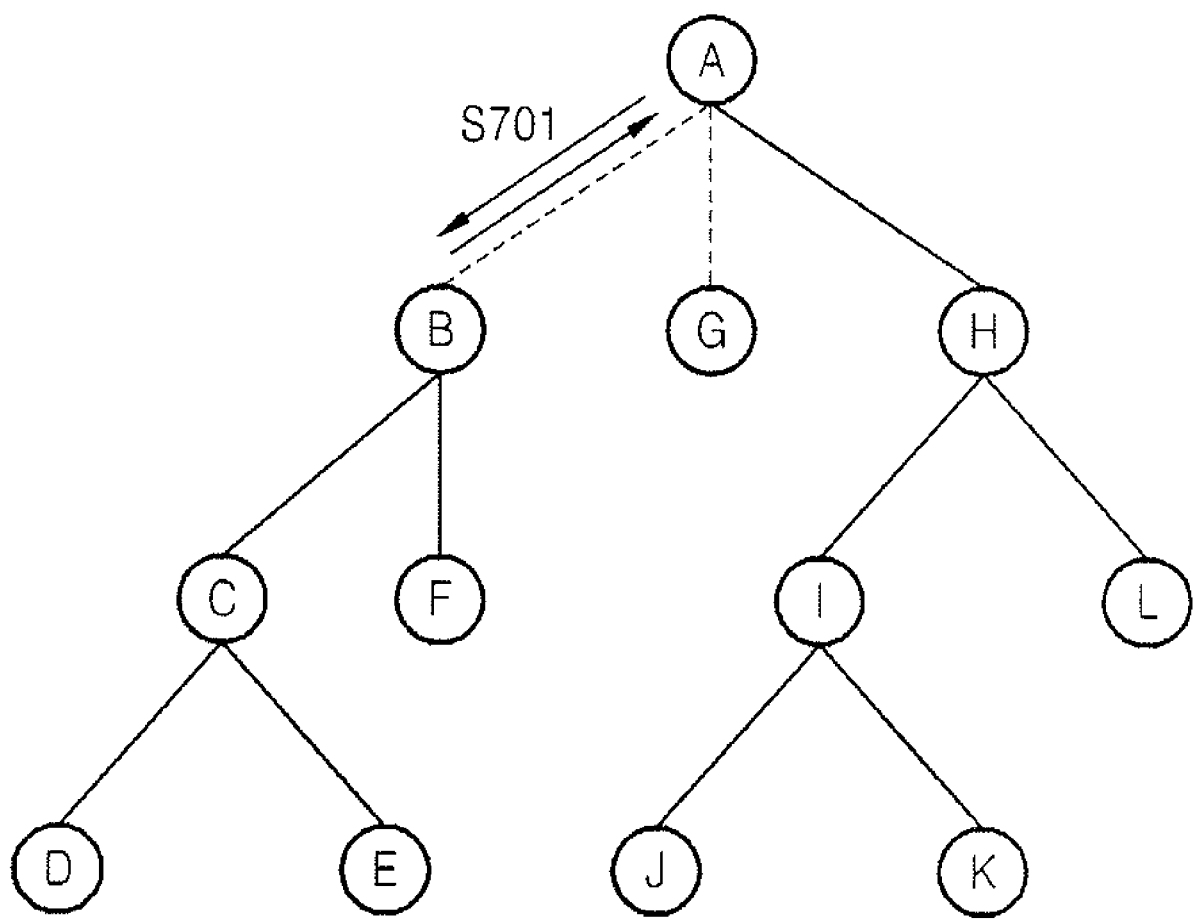
FIG. 7 illustrates a transmission flow in an address management method for incommunicable nodes having addresses withdrawn in the ZigBee network according to an embodiment of the present invention.

FIG. 7 illustrates a transmission flow in an address management method for incommunicable nodes having addresses withdrawn in a ZigBee network according to an embodiment of the present invention. A method of detecting and removing an incommunicable node with a withdrawn address is as follows.

When each child node transmits data to a parent node, it also transmits its address value and sequence ID. Then, the parent node identifies whether the sequence ID transmitted from each child node is a latest value (sequence ID). If the sequence ID transmitted from a child node is the latest value (sequence ID), the parent node accepts data transmitted from the child node. However, if the sequence ID transmitted from the child node is not the latest value (sequence ID), the parent node transmits a leave command message to the child node. In this way, if the parent node detects a child node which continues to transmit data using a withdrawn address value, it commands the child node to select and join a new parent node.

Referring to FIG. 7, node B whose address value was withdrawn in the example illustrated in FIG. 5 transmits data to node A in operation S701. If node A assigned the address value, which had been withdrawn from node B, to another node, since a sequence ID recorded in the data transmitted from node B is not a latest sequence ID, node A transmits a leave command message to node B or assigns a new address value and sequence ID to node B.

Figure 8:
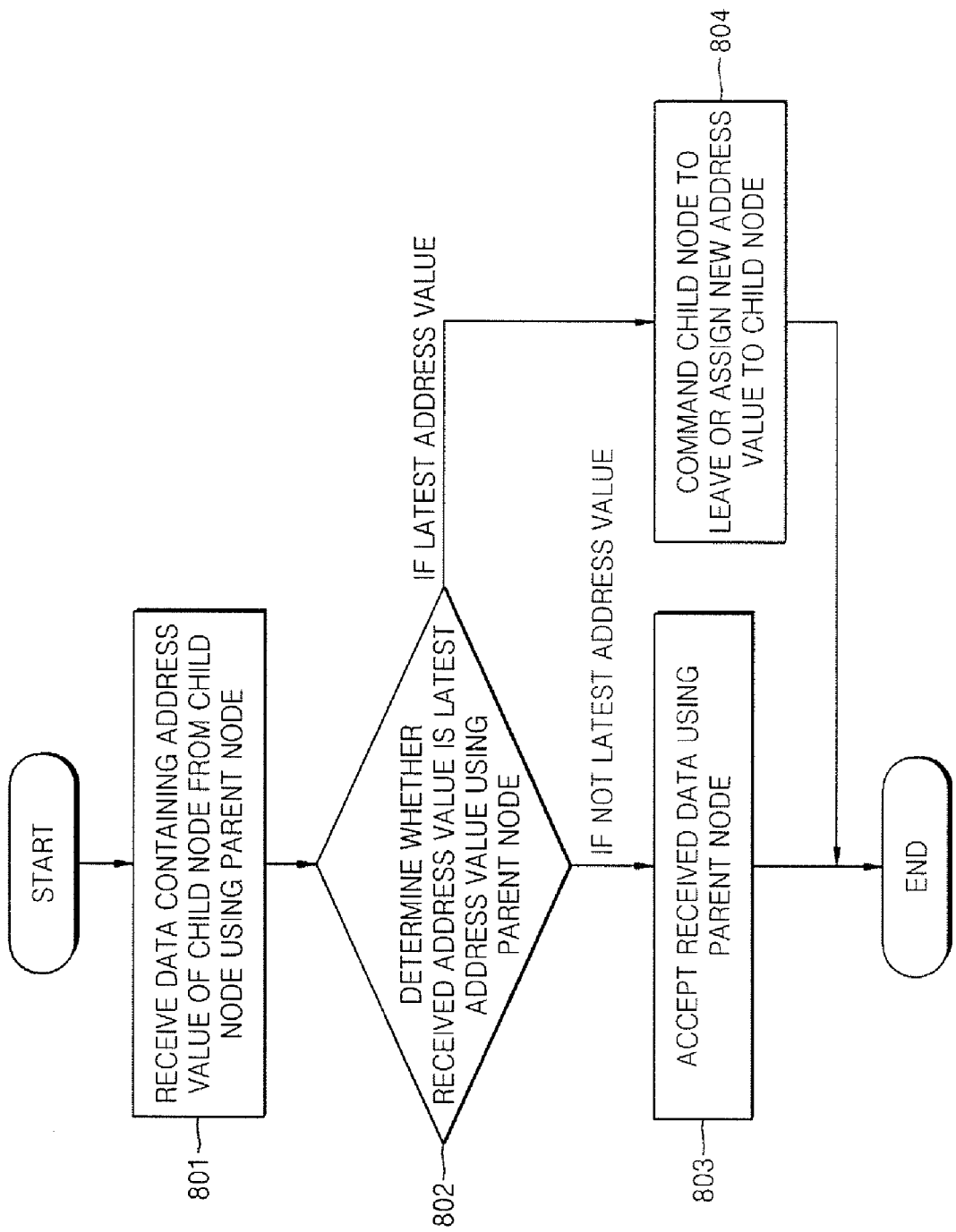
FIG. 8 is a flowchart illustrating an address management method for incommunicable nodes having addresses withdrawn in the ZigBee network according to an embodiment of the present invention.

FIG. 8 is a flowchart illustrating an address management method for incommunicable nodes having addresses withdrawn in a ZigBee network according to an embodiment of the present invention.

Referring to FIG. 8, a parent node (a first node) receives from a child node (a second node) data containing an address value of the child node (operation 801). Then, the parent node identifies whether the received address value of the child node is a latest address value (operation 802).

If the received address value is the latest address value, the parent node accepts the data (operation 803). If the received address value is not the latest address value stored in the parent node, the parent node commands the child node to leave or assigns a new address value to the child node (operation 804).

As described above, the present invention withdraws an address value of a node which malfunctions, has a battery that is exhausted, or has moved to another network without transmitting a leave message in order to allow another node to join a network. In addition, since the address value is withdrawn and reused, problems due to double assignment of the same address value or overlapping address values can be prevented.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing address spaces of incommunicable nodes, the method comprising:
   receiving a hello message indicating communicability from a second node, wherein the second node is a child node of a first node in a ZigBee network;
   storing a received time when the hello message was received by the first node in the ZigBee network; and
   if a difference between a current time and the received time is less than or equal to a predetermined time then the second node in the ZigBee network transmits a message identifying communicability to the first node;
   otherwise if the difference between the current time and the received time is greater than the predetermined time then the second node in the ZigBee network transmits a different message to the first node withdrawing an address-value assigned by the second node.

2. A method of managing address spaces of incommunicable nodes, the method comprising:

transmitting by a first node in a ZigBee network a message identifying whether said first node in the ZigBee network can communicate with said second node wherein said second node is a child node; and retransmitting the message identifying whether said first node in the ZigBee network can communicate with said second node up to a predetermined number of retransmission and if a reply is not received within the predetermined number of retransmission then transmitting a message withdrawing an address value assigned to the second node.

3. A method of managing address spaces of incommunicable nodes, the method comprising:

transmitting by a first node in a ZigBee network a message identifying whether said first node in the ZigBee network can communicate with said second node wherein said second node is a child node;

accepting the data if the address value received and the latest address value match;

not accepting the data if the address value received and the latest address value do not match and either commanding the second node to leave or assign a new address value to the second node.

4. The method of claim 3, wherein the received address value of the second node comprises a sequence ID indicating where the second node come in a series of child nodes of the first node in the ZigBee network; comparing the received address value and the sequence ID to the latest address value and a latest sequence ID stored in the first node of the ZigBee network; if the received address value and the latest address value as well as the sequence ID and the latest sequence ID match then accept the data; if the receive address value and the latest address value as well as the sequence ID and the latest sequence ID do not match then command the second node to leave or assign a new address value and a new sequence ID to the second node.

* * * * *